H. H. BOREN.
TIRE.
APPLICATION FILED JUNE 4, 1921.

1,411,155. Patented Mar. 28, 1922.

Henry H. Boren
INVENTOR

BY Victor J. Evans
ATTORNEY

WITNESS:

UNITED STATES PATENT OFFICE.

HENRY H. BOREN, OF BAKERSFIELD, CALIFORNIA.

TIRE.

1,411,155.  Specification of Letters Patent.  Patented Mar. 28, 1922.

Application filed June 4, 1921. Serial No. 474,879.

*To all whom it may concern:*

Be it known that I, HENRY H. BOREN, a citizen of the United States, residing at Bakersfield, in the county of Kern and State of California, have invented new and useful Improvements in Tires, of which the following is a specification.

My present invention has reference to a core for tire casings.

My object is to provide a tire casing with a resilient core which will afford almost as much elasticity as the usual inflated inner tube, but which will obviate the disadvantages of such tubes as the core is not susceptible to punctures.

The drawings illustrate a satisfactory embodiment of the improvement reduced to practice, and in the said drawings:—

Figure 1:
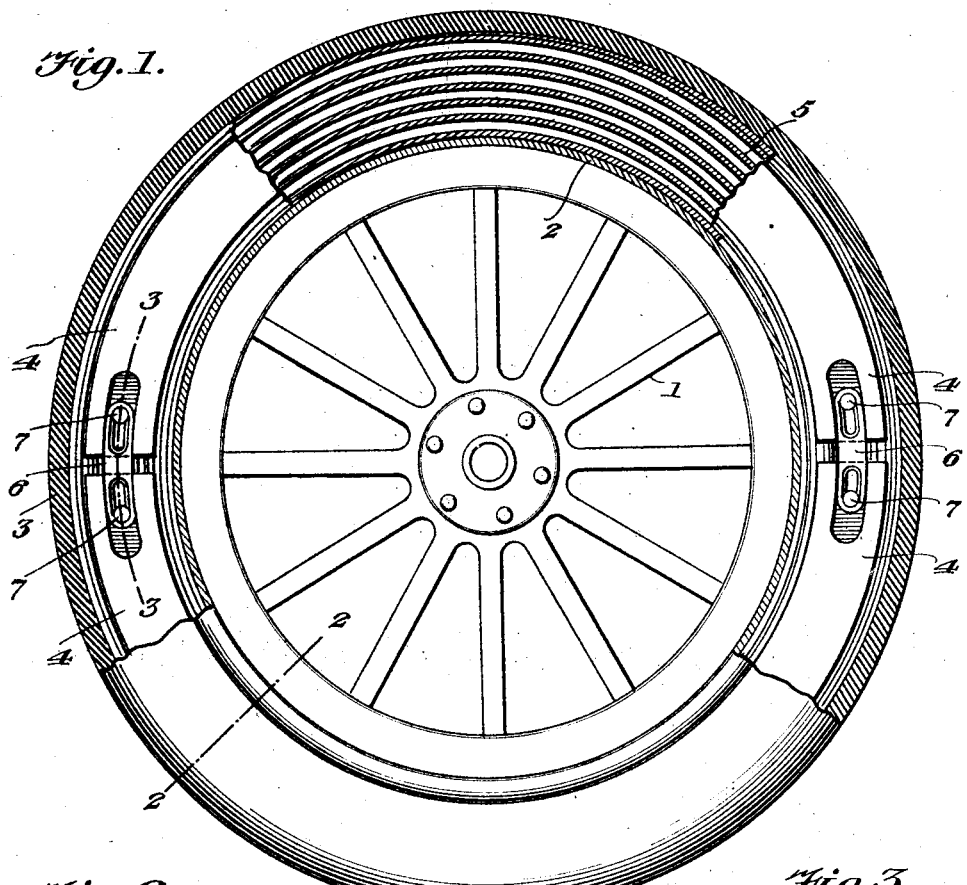
Figure 1 is a side elevation of the improvement applied on a wheel, parts being broken away and parts being in section.
Figure 2:
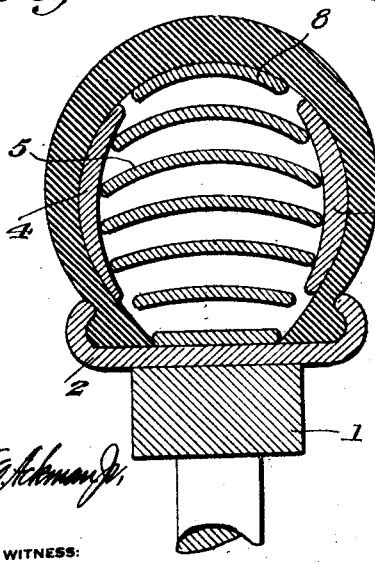
Figure 2 is a sectional view approximately on the line 2—2 of Figure 1, on an enlarged scale.
Figure 3:
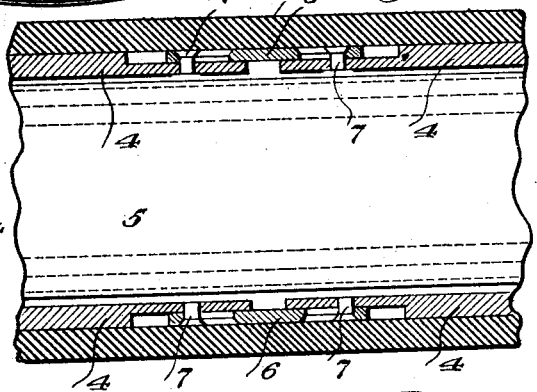
Figure 3 is a sectional view on the line 3—3 of Figure 1, also on an enlarged scale.

A vehicle wheel is, in the drawings, indicated by the numeral 1. The wheel has its felly provided with the usual clincher tire carrying rim 2 which engages the beaded edges of the tire casing 3.

My improved resilient core construction includes sides 4 and an inner member 5. Each side is, of course, ring shaped in plan and is concavo-convex in cross section. Each side also includes a plurality of spaced segments, the said segments at their confronting ends being connected by means which permit of the said ends contacting when undue pressure is applied to the said side members. This means is preferably in the nature of slotted bars 6 received in the depressions in the outer faces of the segments, the said depressions being provided with headed studs 7 that pass through the slots of the bars 6.

The inner member is in the nature of a spirally wound spring which, as a whole, is substantially round in cross section and which has its inner peripheral portion substantially flat to correspond to the flat outer face of the rim 2, the convolutions, from the said flat portion being gradually concaved outwardly and being gradually widened from the said flat portion to the center thereof and from thence gradually reduced to the outer convolution which, for distinction is indicated by the numeral 8. This outer convolution, and if desired, the next inner convolution is projected beyond the outer edges of the sides 4. The construction of the core is such that the sides and the outer convolution of the inner member 5 are in contacting engagement with the inner surface of the casing 3. Ordinarily, the side members are sustained in spaced relation to each other by the expanded spiral inner member, and it is thought that the foregoing description, when taken in connection with the drawings will amply set forth the construction and advantages of the improvement.

Having described the invention, I claim:—

1. A core for tire casings, comprising annular sides which are concaved in cross section, each of said sides comprising spaced segments, a spirally wound member received between and having the edges of its inner convolutions in contacting engagement with the sides and its outer periphery projecting beyond the outer edges of the sides.

2. A core for tire casings, comprising annular side members which are concavo-convex in cross section, each of said side members comprising spaced segments, means loosely connecting the segments permitting a contacting engagement of the confronting ends thereof, and a spirally wound spring member received between and having the edges of its inner convolutions contacting with the sides and its outer periphery projecting beyond the outer edges of the sides.

3. A core for tire casings, comprising annular sides which are concavo-convex in cross section and which comprise a plurality of spaced segments, each of said segments on their outer surface at their ends having depressions, slotted bars received in the depressions, pins passing through the slots of the bars and secured to the walls of the depressions, a spirally wound central member arranged between the sides, said member having its inner convolution flat and the remaining convolutions gradually rounded upon themselves outwardly and the edges of its inner convolutions contacting with the inner surface of the sides, and the outermost convolution of the inner member being projected beyond the outer edges of the sides.

In testimony whereof I affix my signature.

HENRY H. BOREN.